UNITED STATES PATENT OFFICE.

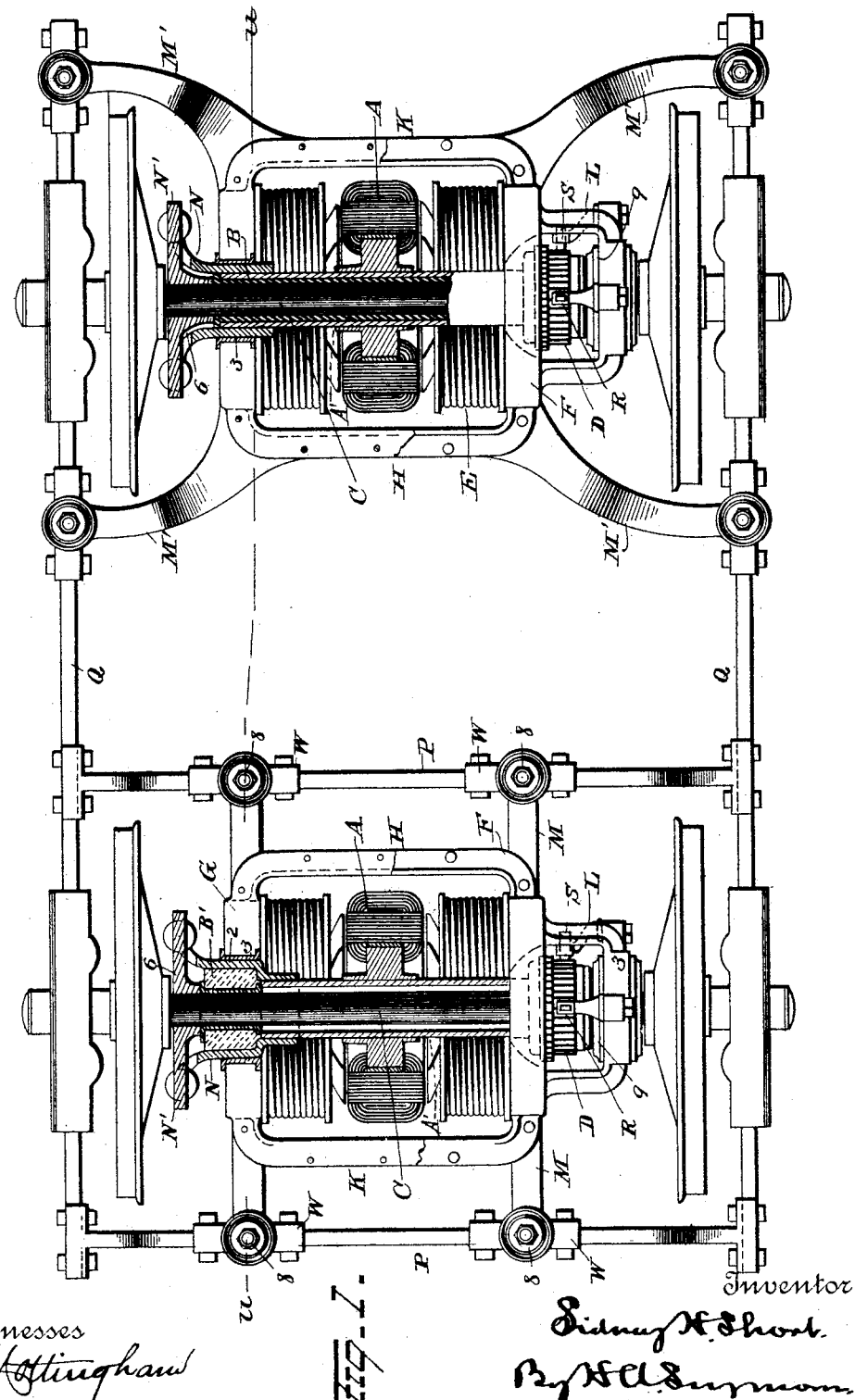

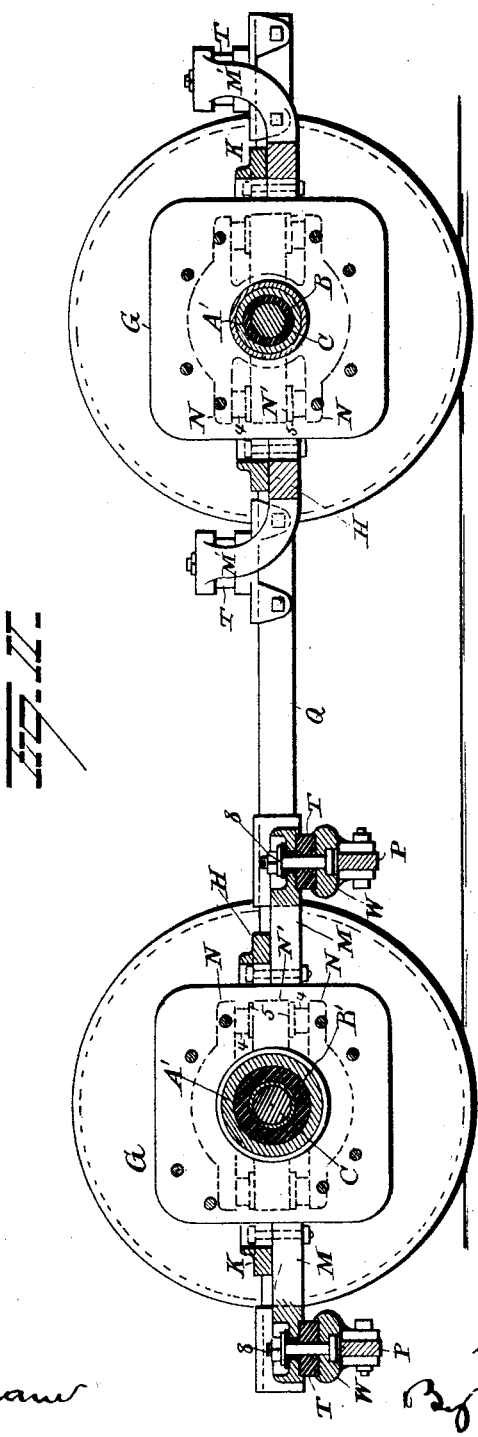

SIDNEY H. SHORT, OF CLEVELAND, OHIO, ASSIGNOR TO THE SHORT ELECTRIC RAILWAY COMPANY, OF SAME PLACE.

MOUNTING FOR MOTORS OF ELECTRIC CARS.

SPECIFICATION forming part of Letters Patent No. 459,024, dated September 8, 1891.

Application filed December 24, 1890. Serial No. 375,666. (No model.)

*To all whom it may concern:*

Be it known that I, SIDNEY H. SHORT, of Cleveland, in the county of Cuyahoga and State of Ohio, have invented certain new and useful Improvements in Mountings for Motors of Electric Cars; and I do hereby declare the following to be a full, clear, and exact description of the invention, such as will enable others skilled in the art to which it appertains to make and use the same.

This invention relates to the mountings for the motors of electric cars which have their armatures axially placed with reference to driving-axles and directly connected with the same. By "axially placed" is to be understood that the axes of the armature and driving-axle are coincident, or nearly so. By "directly connected," is to be understood that the driving-axle makes one revolution to each revolution of the armature.

In accordance with the present invention the axially-placed and directly-connected armature is combined with field-magnets, which are provided with bearings on the car-axle and also at points in at least two vertical planes parallel with the axis of the car-axle and preferably on opposite sides of the said axle, so that the center of gravity of the field-magnets is between said planes. The bearings outside the car-axle may be on any suitable frame or part or parts of the car, as, for example, the car-body, other car-axles, or a frame under the car-body or the like. By providing a bearing for the field-magnets on the car-axle the position of the field-magnets relatively to the car-axle is determined, while the outside supports may sustain so much of the weight as is desired, and said weight may thus be distributed over a number of points or bearings. Further, in accordance with the present invention springs or buffers are interposed at one or more (preferably all) of the points above named, so as to cushion the said magnets.

The foregoing improvements may be employed in a motor having field-magnets which are capable of movements transverse to the armature-axis, as described in prior applications; but they will be shown herein in connection with a motor in which the position of the armature-axis relatively to the field-magnets is fixed. In this arrangement (which also forms the subject-matter of a prior application and which is specially included in the present invention in connection with bearings, as above) journal-bearings are formed between the field-magnets and the armature-shaft, which may be the car-axle or a hollow shaft surrounding the car-axle. The cushion between the motor and the car-axle moderates the transverse movement of the armature relatively to the car-axle, and, further, avoids any possibility of the motor striking a blow on the car-axle in case of a very heavy jolt, or even if one of the other supports should give way. With an insulated motor it insures against an accidental grounding of the motor under like circumstances. The proportion of weight of the motor which is normally put on the different bearings may be adjusted as desired. The weight might almost entirely be borne by the supports on the opposite sides of the car-axle or a large portion might be put on the intermediate bearing on the car-axle.

The above-mentioned mounting or mountings are included generally in the invention, irrespective of the precise form of motor. The invention, however, covers special features in regard to this—that is to say, first, the field-magnets are arranged symmetrically with reference to the car-axle; second, the field-magnets are arranged horizontally; third, the field-magnets are placed above (or not materially below) the lowest point of the armature; fourth, the field-magnets are placed at the sides of the armature parallel with the said axle; fifth, the field-magnets project from yokes at the sides of the armature, which are provided with openings for the passage of the car-axle; sixth, multipolar field-magnets are employed, the armature being adapted for use with such a field, as by means of cross-connections at the commutator; seventh, the field-magnets of the multipolar field are so arranged that the magnets of the two lowermost poles are equidistant from the lowest point of the armature, one in front and one in rear of the same. In this position the field-magnets may project somewhat beyond the periphery of the armature and still be above its lowest point. Although it is designed to use all these features in connection with one another, yet it is obvious that one or more of them may be used without the others, and the invention extends to such use.

In the accompanying drawings, which form part of this specification, Figure I is a partial plan view, partly in horizontal section, of an electric-car truck provided with motors mounted in accordance with the invention; and Fig. II is a view in sectional elevation on line $i\,i$ of Fig. I.

In Figs. I and II somewhat different mountings are shown for the two motors. This is done for the purpose of saving illustration, as practically the motors on both axles would be made as nearly identical as possible, although of course they might be different, as shown. In both motors the armature A is composed of a soft-iron strip wound upon itself and provided with bobbins of insulated wire wrapped about the ring so made in notches in the edges thereof. The bobbins are connected in closed series, and from the junctions wires are led to the strips of a commutator D. In both motors the armature is fast on a hollow shaft A', which surrounds the car-axle C, an insulating-cushion of, say, soft vulcanized rubber, being interposed. In the motor at the right of the figures this insulating-cushion is in the form of a sleeve B. In the motor at the left of the figures blocks or rings B' are interposed between bushings on the car-axle and sockets 2 at the ends of the hollow shaft A'. In both motors the direct driving connection is made by forks N on the shaft A' engaging arms N', projecting from a hub 6, which is fast on the car-axle. Spring-pads 4, of, say, soft vulcanized rubber, are interposed between the forks N and the arms N', the ends of the pads being protected by metal caps 5.

The field-magnets E are arranged symmetrically about the car-axle in a horizontal position above (or not materially below) the lowest point of the armature at the sides of the armature parallel with the car-axle. These are (as represented) eight in number, to form a multipolar field of four poles, each pole being constituted by two magnets in line with each other on opposite sides of the armature. These field-magnets are so arranged that the four lowermost magnets are equidistant from the lowest point of the armature, the magnets of one polarity being in front and those of the other sign in rear of said lowest point. The magnets E project from yokes F G, which are perforated for the passage of the car-axle C and which have a bearing thereon, said bearing, as shown, being made through the intermediary of the armature-shaft A' and the springs or buffers B or B'.

In the yoke G and the bracket L, which is fastened to the yoke F, there are journal-bearings, as shown at 3, to permit the shaft A' to turn relatively to the field-magnets. The yokes F G are fastened together by the arms H K.

To facilitate the application to the car-axle, the yokes F G, bracket L, and arms H K are divided horizontally through the journal-bearings 3. The field-magnets in both motors also have bearings on opposite sides of the car-axle. In the motor at the left of the figures the yokes F G are provided with supporting-arms M, which rest upon cross-bars P, whose ends are fastened to the side bars Q of the truck-frame. Between the arms M and the cross-bars P springs or buffers T, of, say, soft vulcanized rubber, are interposed. As shown, there are heads W fastened by forks and bolts to the cross-bars P, and the springs or buffers T are placed on these heads W, bolts 8 holding the arms M to the heads W. These bolts 8 have insulating-sleeves where they pass through the arms M, so that the motor is insulated from the wheel-base of the car. In the motor at the right of the figures the yokes F G are provided with supporting-arms M', which rest upon side bars Q, springs or buffers T being interposed, the same as described for the arms M and the cross-bars P. The side bars Q might be of any ordinary form and might be upheld by the pedestals, so as to partake of the vertical movements of the car-body; but it is preferred to have them upheld by the car-axle boxes independent of the main springs of the car, so as not to partake of the movements of the car on said main springs. Springs or buffers might of course be interposed between the side bars and the car-axle boxes in any known or suitable way. The position of the field-magnets relatively to the armature A may be adjusted by the nuts 9.

Instead of supporting the motor on side bars, other suitable frame could be used—such, for example, as described in my prior applications.

It will be perceived that in both motors of the drawings the motor with axially-placed and directly-connected armature has cushioned bearings, not only on the car-axle, but at points on opposite sides of said axle. The commutator D is fast on the armature-shaft A' and rotates in contact with brushes R and S, which are placed ninety degrees apart for the four-pole machine shown. The current is supplied to and cut off from the motor in any known or suitable way.

In the foregoing description the armature has been described as rotating with the car-axle and the field-magnets as non-rotative. It is evident that this might be reversed, the field-magnets being allowed to rotate and being connected directly with the car-axle to turn the same and the armature being held from rotation. It will be understood that this reverse arrangement is included in the invention as a substitute for that particularly described without further specification herein.

Having fully described my invention, what I claim as new, and desire to secure by Letters Patent, is—

1. The combination, with a car, of a propelling-motor comprising an axially-placed and directly-connected armature and field-magnets provided with bearings on the car-axle, and supports for sustaining the weight of the field-magnets at points in two vertical planes parallel with the said axle, substantially as described.

2. The combination, with a car, of a propelling-motor comprising an axially-placed and directly-connected armature, and field-magnets provided with cushioned bearings on the car-axles and at points in two vertical planes parallel with the said axle, substantially as described.

3. The combination, with a car, of a propelling-motor comprising an axially-placed and directly-connected armature, and field-magnets provided with bearings on the car-axle and at points in two vertical planes parallel with the said axle, one or more of said bearings being cushioned, substantially as described.

4. The combination, with a car, of an insulated propelling-motor comprising an axially-placed and directly-connected armature, and field-magnets provided with bearings on the car-axle, and supports for sustaining the weight of the field-magnets at points in two vertical planes parallel with the said axle, substantially as described.

5. The combination, with a car, of an insulated propelling-motor comprising an axially-placed and directly-connected armature, and field-magnets provided with bearings on the car-axle and at points in two vertical planes parallel with the said axle, one or more of said bearings being cushioned, substantially as described.

6. The combination, with a car, of a propelling-motor comprising an axially-placed and directly-connected armature, and field-magnets provided with bearings on the car-axle and with supports on opposite sides of said axle for sustaining the weight of the field-magnets, substantially as described.

7. The combination, with a car, of a propelling-motor comprising an axially-placed and directly-connected armature, and field-magnets provided with cushioned bearings on the car-axle and on opposite sides of said axle, substantially as described.

8. The combination, with a car, of a propelling-motor comprising an axially-placed and directly-connected armature, and field-magnets provided with bearings on the car-axle and on opposite sides of said axle, one or more of said bearings being cushioned, substantially as described.

9. The combination, with a car, of an insulated propelling-motor comprising an axially-placed and directly-connected armature, and field-magnets provided with bearings on the car-axle and with supports on opposite sides of said axle for sustaining the weight of the field-magnets, substantially as described.

10. The combination, with a car, of an insulated propelling-motor comprising an axially-placed and directly-connected armature, and field-magnets provided with bearings on the car-axle and on opposite sides of the same, one or more of said bearings being cushioned, substantially as described.

11. The combination, with a car, of a propelling-motor comprising an axially-placed and directly-connected armature, and field-magnets provided with bearings on the car-axle and with supports on the truck-frame or frame below the car-body on opposite sides of said axle for sustaining the weight of the field-magnets, substantially as described.

12. The combination, with a car, of a propelling-motor comprising an axially-placed and directly-connected armature, and field-magnets provided with cushioned bearings on the car-axle and on the truck-frame or a frame in general under the car-body on opposite sides of said axle, substantially as described.

13. The combination, with a car, of a propelling-motor provided with bearings on the car-axle and with supports on opposite sides thereof for sustaining the weight of the field-magnets, and comprising an axially-placed and directly-connected armature having its axis of rotation fixed with relation to the field-magnets, substantially as described.

14. The combination, with a car, of a propelling-motor provided with cushioned bearings on the car-axle and on opposite sides thereof, and comprising an axially-placed and directly-connected armature having its axis of rotation fixed with relation to the field-magnets, substantially as described.

15. The combination, with a car, of a motor provided with bearings on the car-axle and with supports on opposite sides thereof for sustaining the weight of the field-magnets, and comprising an axially-placed and directly-connected armature journaled in bearings in the frame of said motor, substantially as described.

16. The combination, with a car, of a propelling-motor having bearings on the car-axle and with supports on opposite sides thereof for sustaining the weight of the field-magnets, and comprising an axially-placed and directly-connected armature, and field-magnets arranged symmetrically with reference to the car-axle, substantially as described.

17. The combination, with a car, of a propelling-motor comprising an axially-placed and directly-connected armature, and horizontally-arranged field-magnets provided with bearings on the car-axle and with supports on opposite sides thereof for sustaining the weight of the field-magnets, substantially as described.

18. The combination, with a car, of a propelling-motor provided with bearings on the car-axle and with supports on opposite sides thereof for sustaining the weight of the field-magnets and comprising an axially-placed and directly-connected armature, and field-magnets placed above (or not materially below) the lowest point of the armature, substantially as described.

19. The combination, with a car, of a propelling-motor provided with bearings on the car-axle and with supports at points on opposite sides of said axle for sustaining the weight of the field-magnets and comprising an axially-placed and directly-connected armature, and field-magnets at the sides of the armature parallel with the said axle, substantially as described.

20. The combination, with a car, of a propelling-motor provided with bearings on the car-axle and with supports at points on opposite sides of the same for sustaining the weight of the field-magnets and comprising an axially placed and directly-connected armature, and field-magnets projecting at the sides of said armature from yokes perforated for the passage of said axle, substantially as described.

21. The combination, with a car, of a propelling-motor provided with bearings on the car-axle and with supports at points on the opposite sides of same for sustaining the weight of the field-magnets, and comprising an axially-placed and directly-connected armature and multipolar field-magnets, substantially as described.

22. The combination, with a car, of a propelling-motor provided with bearings on the car-axle and with supports on opposite sides of the same for sustaining the weight of the field-magnets, and comprising an axially-placed and directly-connected armature and multipolar field-magnets arranged with the magnets of the two lowermost poles equidistant from the lowest point of the armature in front and rear of the same, substantially as described.

23. The combination, with a car, of a propelling-motor provided with cushioned bearings on the car-axle and on opposite sides thereof, and comprising an armature mounted on a hollow shaft surrounding the car-axle and having a direct driving connection therewith and journaled in the motor-frame, substantially as described.

In testimony whereof I have signed this specification in the presence of two subscribing witnesses.

S. H. SHORT.

Witnesses:
    A. B. CALHOUN,
    C. J. LEEPHART.